United States Patent
Allouche (10) Patent No.: US 7,379,615 B2
(45) Date of Patent: May 27, 2008

(54) METHOD FOR SPACE-TIME FILTERING OF NOISE IN RADIOGRAPHY

(75) Inventor: Cyril Allouche, Montfort l'Amaury (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 751 days.

(21) Appl. No.: 10/677,966

(22) Filed: Oct. 2, 2003

(65) Prior Publication Data
US 2004/0086194 A1    May 6, 2004

(30) Foreign Application Priority Data
Oct. 31, 2002    (FR) .................................. 02 13727

(51) Int. Cl.
*G06K 9/40* (2006.01)
*G06K 9/00* (2006.01)

(52) U.S. Cl. .................. 382/260; 382/132; 382/261; 382/262; 382/279; 378/4

(58) Field of Classification Search .............. 382/279, 382/260, 261, 262, 132; 378/4, 6, 7
See application file for complete search history.

(56) References Cited

U.S. PATENT DOCUMENTS 4,739,481 A * 4/1988 Yoshitome .................. 600/425
5,315,665 A * 5/1994 Ohhashi ....................... 382/131
5,440,647 A * 8/1995 Floyd et al. ................. 382/132
5,881,178 A * 3/1999 Tsykalov et al. ........... 382/260
5,911,012 A * 6/1999 Bernard et al. ............. 382/260

(Continued)

OTHER PUBLICATIONS

Kruger et al., "A regional convolution kernel algorithm for scatter correction in dual-energy images: Comparison to single-kernel algorithms," Med. Phys. 21 (2), pp. 175-184, Feb. 1994.*

(Continued)

*Primary Examiner*—Jingge Wu
*Assistant Examiner*—Jeffrey S Smith
(74) *Attorney, Agent, or Firm*—Cantor Colburn LLP (57) ABSTRACT

To reduce the fluoroscopic noise in an image I acquired at a date t, the pixels of this image are paired with the pixels of an image I' acquired at a date t−1. For a pixel with coordinates (x,y) of the image I, a convolution is done with a core U equivalent to a low-pass filter whose coefficients have been modified as a function of the neighborhood of the pixel with coordinates (x,y) in the image I. For the pixel paired in the image I', a convolution is done with the core U whose coefficients have been modified as a function of the neighborhood of the pixel with coordinates (x,y) in the image I'. The result of the two convolutions is associated linearly in order to obtain a filtered value for the pixel with coordinates (x,y). These operations are repeated for each pixel of the image I.

45 Claims, 3 Drawing Sheets

U.S. PATENT DOCUMENTS

| | | | |
|---|---|---|---|
| 6,016,356 A * | 1/2000 | Ito et al. ..................... | 382/132 |
| 6,112,112 A * | 8/2000 | Gilhuijs et al. ............. | 600/425 |
| 6,351,571 B1 * | 2/2002 | VanMetter et al. ......... | 382/254 |
| 6,421,410 B1 * | 7/2002 | Kropfeld ...................... | 378/4 |
| 6,704,591 B2 * | 3/2004 | Sakaida ....................... | 600/407 |
| 6,728,415 B2 * | 4/2004 | Shaw ........................... | 382/261 |
| 6,792,067 B2 * | 9/2004 | Sembritzki .................... | 378/4 |
| 6,834,125 B2 * | 12/2004 | Woodell et al. ............. | 382/274 |
| 7,142,706 B2 * | 11/2006 | Horbaschek ................. | 382/132 |
| 7,162,066 B2 * | 1/2007 | Oosawa ....................... | 382/132 |
| 2002/0010543 A1 | 1/2002 | Ojo et al. | |
| 2002/0028025 A1 | 3/2002 | Hong | |
| 2002/0154728 A1 * | 10/2002 | Morita et al. ................. | 378/4 |

OTHER PUBLICATIONS

Naimuddin et al., "Scatter-glare correction using a convolution algorithm with variable weighting," Med. Phys. 14 (3), pp. 330-334, May/Jun. 1987.*

Aufrichtig et al., "X-ray Fluoroscopy Spatio-Temporal Filtering with Object Detection", IEEE Transactions on Medical Imaging, vol. 14, No. 4, Dec. 1, 1995, pp. 733-746.

* cited by examiner

METHOD FOR SPACE-TIME FILTERING OF NOISE IN RADIOGRAPHY

CROSS-REFERENCE TO RELATED APPLICATIONS

This application claims the benefit of a priority under 35 USC 119(a)-(d) to French Patent Application No. 02 13727 filed Oct. 31, 2002, the entire of which are hereby incorporated by reference.

BACKGROUND OF THE INVENTION

The present invention and embodiments thereof is directed to a method and filter for the reduction of noise in radiography and, more particularly in fluoroscopic images. The invention and embodiments thereof is directed to space-time filtering of noise in images. The field of the invention is more particularly directed to the reduction of noise in images acquired in temporal sequences.

The prior art scanner type image acquisition apparatuses can be used to obtain images of an object, such as the interior of a living organism, and particularly the interior of a human body. Such apparatuses can be used to obtain images of internal organs and perform diagnoses. These images are obtained by the exposure of the object, such as a patient, to radiation that is received on a detector after it has gone through the object. The detector then produces an image that can be interpreted by a specialist practitioner. These images contain noise known as fluoroscopic noise. This fluoroscopic noise is the resultant of quantum noise, caused by the nature of the radiation, and electronic noise, caused by the nature of the detector.

Fluoroscopic noise is present in the image and therefore causes interference with the signal, known as the useful signal or information signal, present in the image. This makes the interpretation of the images difficult, uncertain or even impossible.

In the prior art, there are known ways of improving the signal-to-noise ratio, or SNR. In order to increase the ratio of information present in the image, it is possible to increase the intensity of the radiation. However, this makes the examination more traumatic for the patient, something that is unacceptable for health reasons.

In the prior art, there is a known technique of filtering fluoroscopic noise. In this technique, a temporal mean is taken between the value of two points, or pixels, having the same coordinates in two images. The two images belong to one and the same sequence of images representing one and the same region. The two images have the same framing and parameters of exposure but are taken at different times. If an image I is filtered at the time t, then, for each pixel of the image I, a mean is taken with the corresponding pixel of the image I' obtained at t−1.

This method has several drawbacks. A first drawback lies in the low reduction of noise in the filtered image. This reduction is of the order $\sqrt{2}$ at most. A second drawback lies in the problem of remanence, or the appearance of phantoms in the filtered images. Consider the acquisition of images of an artery into which it is known that a guide has been inserted. A guide is a cylindrical metal object that is introduced into the artery and is therefore visible in radiography. Given that the guide moves at high speed, it is possible that it will be present in the imaged zone at the time t−1, but not at the time t. However, since the image filtered at the time t is obtained by taking the average of the image acquired at the time t and the image acquired at the time t−1, a filtered image is obtained for the time t, and this filtered image shows a guide which, nevertheless, was not present at this time. Thus, an erroneous piece of information has been added to the image of the time t.

A prior art solution gives a noise reduction of 15% and a remanence rate of 10%. This is unsatisfactory because it is a source of error or makes it impossible to carry out diagnosis.

BRIEF DESCRIPTION OF THE INVENTION

An embodiment of the invention provides for a space-time convolution filter to reduce noise in radiographic images.

An embodiment of invention is a method for filtering of noise in radiography comprising:

for each pixel with coordinates (x,y) of a first image, a weighting is performed on the coefficients U(k,l) of a first convolution core with a dimension D, equivalent to a low-pass filter, as a function of a coefficient G which is a function of the difference computed between I(x,y) and I(x+k, y+l), where I(x,y) is the intensity of the pixel with coordinates (x,y) of the first image, and k and l are indices used to explore the coefficients of the convolution core, a second convolution core with coefficients Up(k,l) being thus obtained;

for each pixel with coordinates (x,y) of the first image, a weighting is performed on the coefficients U(k,l) of the first convolution core as a function of the coefficient G which is a function of the difference computed between I(x,y) and I'(x+k, y+l), where I'(x,y) is the intensity of the pixel with coordinates (x,y) of a second image, a third convolution core with coefficients Up'(k,l) being thus obtained;

the filtered value of I(x,y) is computed by the equation:

$$F(x, y) = \left( \sum_{k=-L}^{L} \sum_{l=-L}^{L} (\gamma * Up(k, l).I(x + k, y + l) + (1-\gamma) * Up'(k, l).I'(x + k, y + l)) \right) / N \quad (1)$$

$$L=(D-1)/2 \quad (2)$$

$$\gamma \in [0,1] \quad (3)$$

$$N = \sum_{k=-L}^{L} \sum_{l=-L}^{L} (\gamma * Up(k, l) + (1-\gamma) * Up'(k, l)) \quad (4)$$

where F(x,y) is the filtered value of I(x,y).

An embodiment of the invention is directed to a filter for carryout the above equation.

An embodiment of the invention is directed to a scanner having a filter for carrying out the above equation or the use of such a filter in a scanner.

An embodiment of the invention is directed to a computer program or a computer program product or an article of manufacture that is provided with a filter for carrying out the above equation.

BRIEF DESCRIPTION OF THE DRAWING

The invention will be understood more clearly from the following description and from the figures that accompany it. These figures are given purely by way of an indication and in no way restrict the scope of the invention. Of these figures.

DETAILED DESCRIPTION OF THE INVENTION

Figure 1:
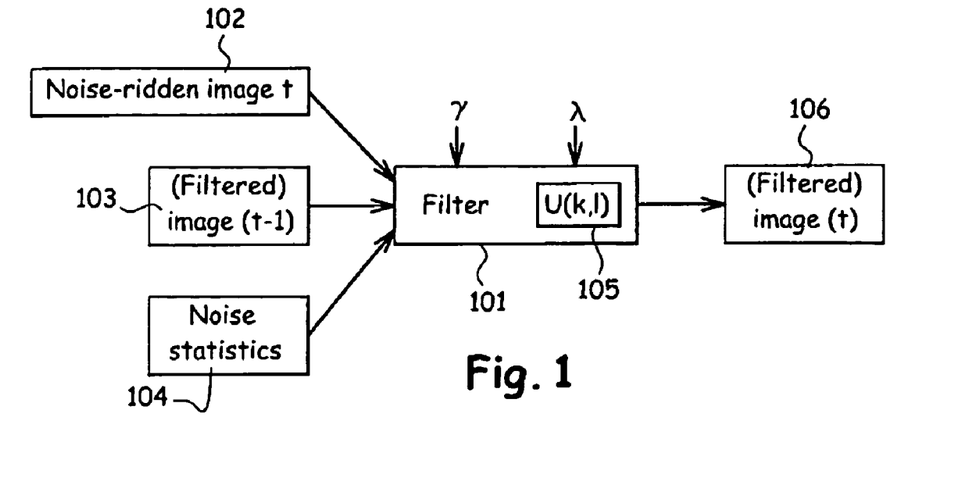
FIG. 1 is a block diagram illustrating the principles of operation of a filter.

FIG. 1 illustrates the working of a filter in an embodiment of the invention. FIG. 1 shows a block 101 corresponding to the implementation of the filter. The filter is implemented in the form of a program or specialized component. The filter, or method according to an embodiment of the invention, is therefore implemented through instruction codes executed by a machine comprising microprocessor type logic circuits. These instruction codes are then recorded in a program memory.

The logic components and memories then form part of a processing apparatus. An apparatus of this kind is either the image acquisition apparatus itself, or a computer connected to the image acquisition apparatus. Here, the term "computer" refers to a personal computer, workstation or the like. An image acquisition apparatus is, for example, a scanner.

Figure 3:
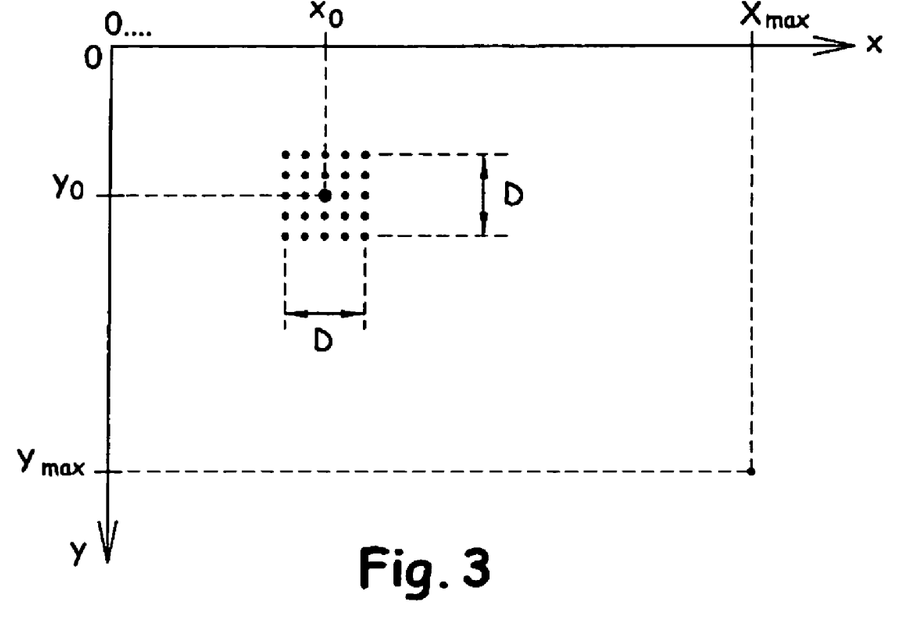
FIG. 3 illustrates the indexing of an image.

FIG. 1 shows that the filter accepts an input of at least up to five parameters or inputs. In an embodiment of the invention, filter 101 may be considered as an apparatus implementing the method. A first input is an image 102, to be filtered, taken at a time t. An image of this kind may have characteristics as illustrated in FIG. 3. Image 102 can be likened to a bitmap image. Image 102 is a digital image delivered by the image acquisition apparatus or obtained from signals delivered by the apparatus. Each pixel of the image 102 is identified by its coordinates (x,y) and by an intensity I(x,y). The intensity is equivalent to a grey level. The dynamic ranges of x,y and I depend on the detector used by the image acquisition apparatus. In general x varies from 0 to Xmax, and y varies from 0 to Ymax. Xmax and Ymax then define the resolution of the image. I(x,y) represents the value of the pixel having coordinates (x,y), i.e., its grey level I varies from 0 2 Imax.

Filter 101 also accepts an input image 103 taken at the time t–1. Image 103 belongs to the same image sequence as the image 102. In the image sequence, the image 103 occupies the place preceding the image 102. Images 102 and 103 have the same definition and represent the same region of space. In a variant embodiment of the invention, image 103 is the result of the filtering, of the image taken at the time t–1. A sequence of images is obtained during an examination by taking several successive shots of one and the same region, as would be done by a video camera. Image sequences of this kind are found when it is sought to image an organ or a region of an organism, during a cycle. Examples of cycles are the heart cycle, the respiratory cycle, or an arbitrarily fixed period of time.

Filter 101 accepts noise statistics 104 as an input. The noise processed is the fluoroscopic noise for which the statistics are known as a function of the value of the gray level of the pixel considered. In particular, the standard deviation of the noise is known because it is known to be proportional to the square root of the number of photons reaching the detector. The number of photons is itself proportional to the gray level. There are known ways therefore of determining the statistics, particularly the standard deviation, for fluoroscopic noise. A simple method to model a fluoroscopic noise present in an X-ray picture uses two successive images of one and the same region in such a way that the pixels of two images can be paired as a function of the region of space that they represent. The pairs of pixels thus obtained are collected together in sub-groups according to their gray level. For each sub-group, the standard deviation $\sigma$ of the values It(x, y)–It–1(x, y) is computed. A sub-group is distinguished by eliminating the pixels for which It(x, y)–It–1(x, y) is greater than the mean of the values It(x, y)–It–1(x, y) plus k times the standard deviation. The computations are repeated a certain number of times for each sub-group. Pairs of pixels (v, $\sigma$) are then obtained. From these pixels, an iterative regression is performed to obtain a noise model according to $\sigma(v)=\alpha.\sqrt{v}+\beta.v+\kappa$, where v is the gray level and $\alpha$, $\beta$ and $\kappa$ are the coefficients defining the noise. There are other possible methods such as the constitution of tables/correspondence charts used to obtain a statistical value for the noise.

Filter 101 accepts firstly a parameter $\gamma$ and a parameter $\lambda$. The parameter $\gamma$ belongs to the interval [0,1]. The lower the importance attached to the temporal aspect of the filter, the closer is this parameter to 1. The parameter $\lambda$ sets the strength of the filter 101. Strength $\lambda$ enables the tolerance of the noise to be modulated. The lower the value of $\lambda$, the less the spatial filtering. The greater the value of $\lambda$, the more is the spatial filtering.

Filter 101 implements a convolution core U, or convolution core 105 with a dimension D. A convolution curve is a square matrix comprising $D^2$ coefficients written as U(k,l) with k and l belonging to the interval [–(D–1)/2, ((D–1)/2]. When a convolution of an image I is done by the core U, it means that a new image F is produced for which:

$$F(x, y) = \sum_{k=-L}^{L} \sum_{l=-L}^{L} (U(k, l).I(x+k, y+l))$$

Figure 2:
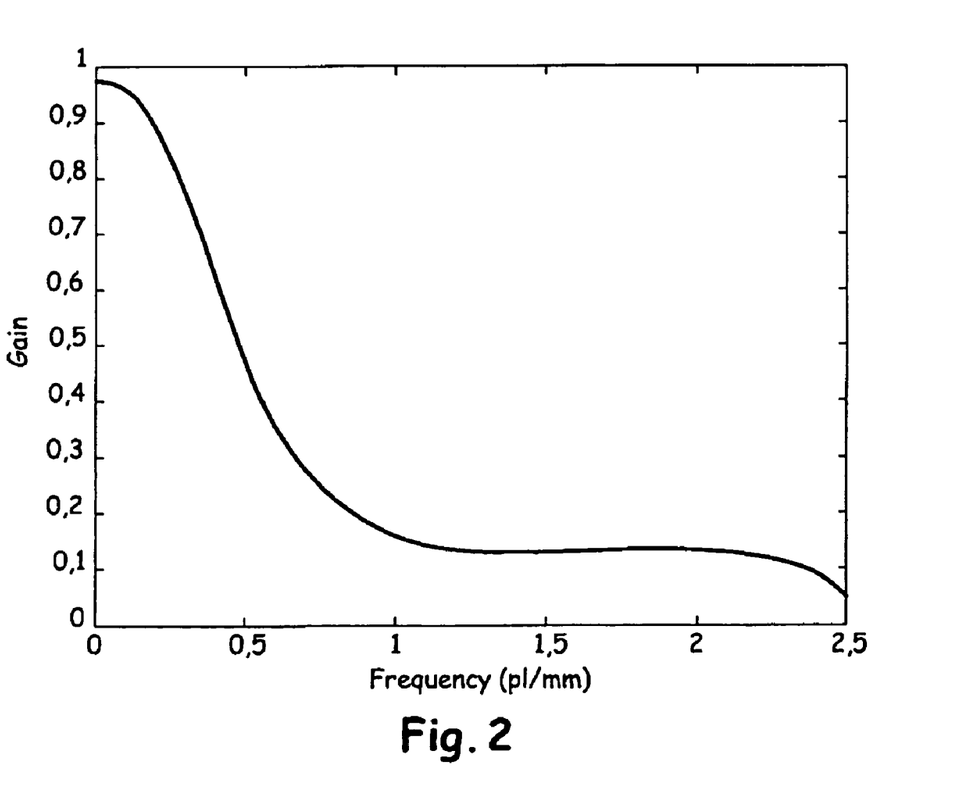
FIG. 2 illustrates a frequency response function of a low-pass filter.

The core U is equivalent to a low-pass filter such as the one whose frequency response curve is shown in FIG. 2. A filter such as this therefore has a gain of 1 for a zero frequency, and its gain decreases rapidly with the frequency. Its implementation by a convolution core, in the particular case where D is equal to 5, obtained by taking the first coefficients of the inverse Fourier transform, gives the following matrix:

| l \ k | –2 | –1 | 0 | 1 | 2 |
|---|---|---|---|---|---|
| –2 | 0.0315715 | 0.0172795 | –0.003931 | 0.0172795 | 0.0315715 |
| –1 | 0.0172795 | –0.00638812 | 0.0965786 | –0.00638812 | 0.0172795 |
| 0 | –0.003931 | 0.0965786 | 0.39044 | 0.0965786 | –0.003931 |
| 1 | 0.0172795 | –0.00638812 | 0.0965786 | –0.00638812 | 0.0172795 |
| 2 | 0.0315715 | 0.0172795 | –0.003931 | 0.0172795 | 0.0315715 |

D has been chosen to be equal to 5 for reasons of computation power and real-time compatibility. Indeed, the filtering time must remain compatible with real-time use and should therefore neither put the human patient under pressure nor constitute a bottleneck for the image output rate. This means that it should be possible to process the images as fast as they are produced by the acquisition device. Similarly, the low-pass filter used is only one low-pass filter among the multitude of existing low-pass filters corresponding to an equivalent number of convolution nodes. The term "real-time" is understood here to mean a rate of filtering such that the processing rate does not exceed 100 ms per image. Ideally, this processing rate is a maximum of 30 ms per image. At present, this performance can be achieved for a reasonable cost with D equal to 5. There is no reason to rule out the possibility that in the future, in accordance with "Moore's law", the real-time and cost constraints can be met with D being equal to 7 or 9 or more.

When the convolution core is applied to pixels located on the edge of the image, namely pixels such that $x<(D-1)/2$, or $x>Xmax-(D-1)/2$, or $y<(D-1)/2$, or $y>Ymax-(D-1)/2$, then the convolution core goes beyond the limits of the image. The coefficients of the convolution core corresponding to pixels located outside the image to be filtered are considered to correspond to pixels whose gray level value is arbitrarily fixed, generally at 0.

As an output, the filter 101 produces an image 106 corresponding to the filtered image 102. Image 106 is reused as the image 103 for the processing of the image required at the time t+1.

Figure 4:
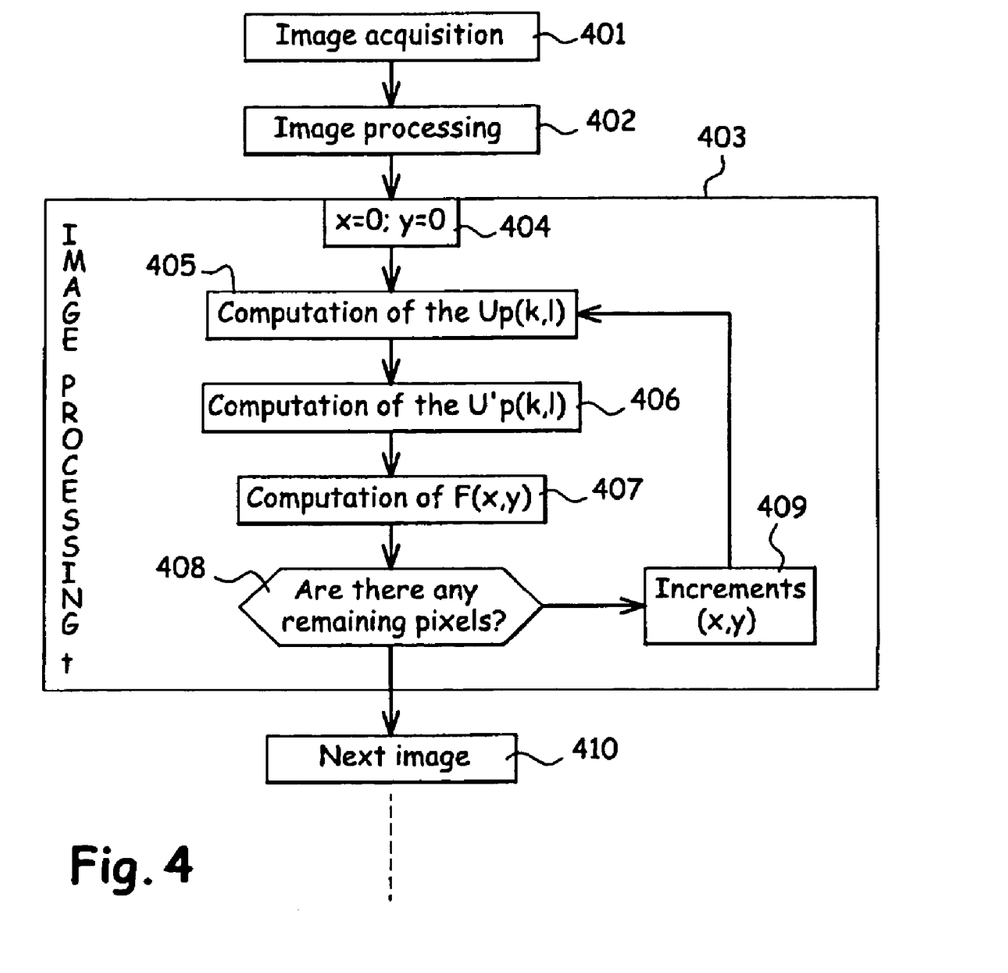
FIG. 4 illustrates steps of the method.

FIG. 4 shows a preliminary image acquisition step 401. An embodiment of the invention works optimally with two images belonging to one and the same sequence of images. However, it also works with only one image: this is the particular case where γ equals 1. And a scanner type image acquisition apparatus produces image sequence. The acquisition starts at an original time that is written as t0 and is arbitrarily equal to 0. For each time tn, the image acquisition apparatus produces an image. All the images produced have the same definition. If not, it is seen to it that the image with the greatest definition has its definition reduced to that of the image with the smallest definition. The images can be available in digital form. As described here, each pixel of an image then has coordinates (x,y) and an intensity I(x,y) equivalent to a gray level.

Step 401 proceeds to step 402 for processing the image t−1. In the present example and as embodiment, a description shall be given of the processing of the image acquired at the time t>t0. Step 402 therefore enables the production of the image 103 used by filter 101 to process the image 102 acquired at the time t. Step 402 is identical to what will be described for the processing of the image acquired at the time t in the step 403.

When the filtering is initialized, i.e., when the image acquired at the time t0 is processed, there is no image t0−1 to play the role of the image 103. In the case of the first filtered image, either γ is fixed at 1, or the image acquired at t0 is not filtered. Not filtering this image amounts to considering it to be a good image and using it as such in the role of the image 103 for the filtering of the image acquired at the time t0+1.

Step 402 proceeds to step 403 for the processing of the image I acquired at the time t. Step 403 comprises several sub-steps. An image is processed pixel by pixel. In step 404, initiating step 403, the operation therefore starts with the initializing of the processing: the operation takes position on the first pixel to be processed. In the present example, it is considered that this is the pixel (0,0). More generally, description of the processing of the pixel having coordinates (x,y). Step 404, the operation proceeds to step 405 for the computation of the values Up(k,l) for the pixel having coordinates (x,y).

Step 404 is the step in which the coefficients U(k,l) of the core U are weighted as a function of the neighborhood of the pixel with coordinates (x,y) in the image I acquired at the time t. The neighborhood of a pixel with coordinates (x,y) in the image I is formed by the $D^2-1$ pixels of the image I closest to the pixel with coordinates (x,y). The pixel with coordinates (x,y) has an intensity or gray level, I(x,y) in the image I. The result of this weighting is a core Up having coefficients Up(k,l). For the pixel with coordinates (x,y) the coefficients Up(k,l) are obtained with the following equation:

$$Up(k,l)=U(k,l)\times G(I(x+k, y+l)-I(x,y); \sigma(I(x,y))).$$

Figure 5:
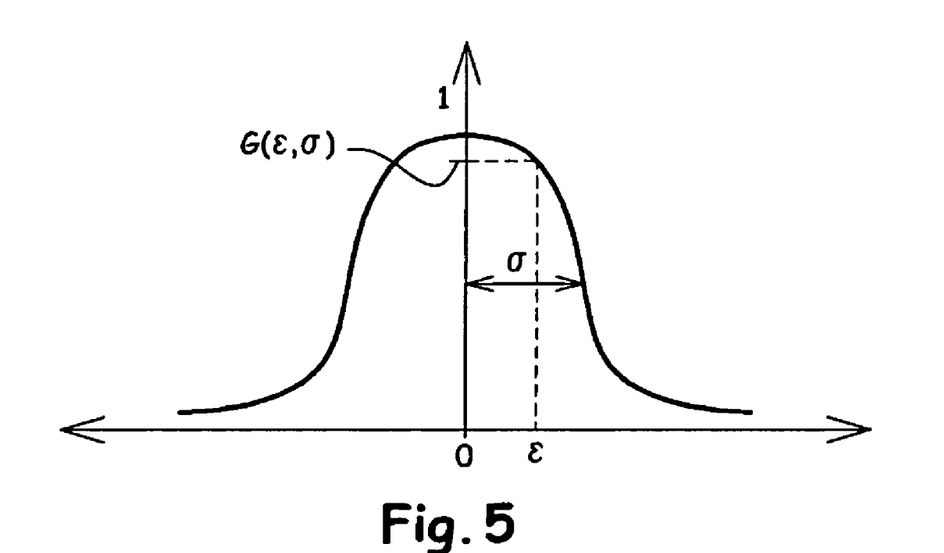
FIG. 5 illustrates a Gaussian curve.

In a variant embodiment of the invention, $G(\epsilon;\sigma)$ is the value of the Gaussian curve centered on 0, with a standard deviation a and such that $G(0; \sigma)=1$. FIG. 5 illustrates a Gaussian curve of this kind. $\sigma(I(x,y))$ is the estimation of the standard deviation of the fluoroscopic noise for I(x,y).

In another variant embodiment of the invention, $G(\epsilon; \sigma)$ is reduced to $G(\epsilon)$ which is a linear function of the type $G(\epsilon)=-a.\epsilon+1$, with a>0.

Step 405, the operation goes to step 406 in which the coefficients U(k,l) of the core U are weighted as a function of the neighborhood of the pixel with coordinates (x,y) in the image I acquired at the time t. The pixel with coordinates (x,y) has an intensity or gray level, I'(x,y) in the image I'. The result of this weighting is a core Up' having coefficients Up'(k,l). For the pixel with coordinates (x,y) the coefficients Up'(k,l) are obtained with the following equation:

$$Up'(k,l)=U(k,l)\times G(I'(x+k, y+l)-I(x,y); \lambda.\sigma(I(x,y))).$$

In a variant embodiment of the invention, the following equation is used:

$$Up'(k,l)=U(k,l)\times G(F'(x+k, y+l)-I(x,y); \lambda.\sigma(I(x,y)))$$

where F'(x,y) is the intensity of the pixel having coordinates (x,y) in the image after filtering.

The coefficient λ is used to set the strength of the filtering. In the same way as γ, λ is a parameter of the filtering in which a user can act whenever he wishes to do so: at the beginning of the processing of an image, during the processing of an image or the beginning of the processing of a sequence. There is no constraint in this respect.

Step 406 the operation goes to step 407 for computing the values F(x,y), where F(x,y) is the intensity of the pixel having coordinates (x,y) of the image I after filtering. The value F(x,y) is obtained by the equation:

$$F(x, y) = \left(\sum_{k=-L}^{L}\sum_{l=-L}^{L} (\gamma * Up(k, l).I(x + k, y + l) + (1 - \gamma) * Up'(k, l).I'(x + k, y + l))\right)/N$$

In this formula, the coefficient γ is used to set the temporal dependence of the filter 101. γ belongs to the interval [0, 1]. The closer γ is to 0, the greater the importance attached to the image I'. At the ultimate point, if γ is equal to 0, the image I no longer has any importance. The closer γ is to 1, the lower the importance attached to the image I'. At the ultimate point, if γ is equal to 1, the image I' no longer has any importance. If γ is equal to 1 the method is equivalent to a purely spatial filter. In particular it can then be applied to the filtering of still images that do not belong to a sequence of images.

The coefficient N is a coefficient of standardization. It is standard for a core and is obtained by the equation:

$$N = \sum_{k=-L}^{L} \sum_{l=-L}^{L} (\gamma * Up(k,l) + (1-\gamma) * Up'(k,l))$$

In these equations L is equal to (D−1)/2, where D is the dimension of the core. D is therefore by nature an odd number because D−1 must be divisible by 2.

From the step 407 the operation goes to a step 408 in which it is ascertained that all the pixels of the image I have truly been filtered. At the end of the filtering operation, there is a filtered image F for which the pixel with coordinates (x,y) has an intensity F(x,y), F(x,y) being a function of I(x,y) of the image I to be filtered. Inasmuch as the definition of the image I is known, the number of pixels to be processed is equal to its vertical definition by its horizontal definition. A simple counter can be used to define an end-of-processing criterion. It is also possible to process only one region of the image. In this case, the definition of the region is known and, therefore, the number of pixels to be processed is known.

If there are pixels that remain to be processed, the operation goes to a step 409 for the iteration of x and y. If not, the operation goes to the step 410 for the processing of the following image.

In step 409 the operation increases the value of x and/or of y as a function of the mode of scanning of the image. In practice, the image is scanned by lines. This means that x is increased by one unit and then, when x is equal to Xmax, y is increased by one unit and x is reset at 0. This process is repeated until x and y are equal to Xmax, and Ymax respectively. Other scanning modes are possible, for example scanning by columns. In general, any scanning mode enabling passage through all the pixels of the image/ region to be filtered is acceptable for the implementation of the method.

Step 409 the proceeds to step 405 for computing Up(k,l).

At step 410 it is ascertained that the image sequence comprises an image t+1 to be processed/filtered. If this is the case, the operation passes from step 410 to step 403 with the difference that the processed image is no longer the image acquired at the time t, but the image acquired at the time t+1, and so on and so forth with t+n, so long as there are images to be processed.

Step 410 may also comprise or be followed by a step for storing the filtered images with a view to reusing them for printing, display or another processing operation. To this end, the apparatus implementing the method comprises a storage memory, and/or means of connection to a screen, and/or means of communication with a third party apparatus processing filtered images, and/or means for processing filtered images. The means for processing are, for example, instruction codes implemented in the same way as the method.

The embodiments of the invention provide for the real-time reduction of a fluoroscopic noise. The embodiments of the invention uses a convolution core, equivalent to a low-pass filter, whose coefficients adapt to each pixel to be filtered. The adaptation is done as a function of the difference between the value of the pixel to be filtered and the value of the neighbors of this pixel. A convolution core is a square matrix that is superimposed on the image to be filtered. Each coefficient of the matrix then has a pixel of the image corresponding to it. The adaptation is also obtained as a function of a known noise statistic σ(v) for the value v of the pixel to be filtered.

An embodiment of the invention also takes the past into consideration since the value of the filtered pixel is the result of the sum of two convolutions weighted by factors γ and (1−γ) with γ in the interval [0, 1]. The first convolution is that mentioned the previous paragraph. The second convolution is made on the image preceding the image to be filtered in a sequence of images. All the convolutions are made from the same core, weighted according to its environment. For the second convolution, the core is weighted as a function of the difference between the value v of the pixel to be filtered and the value of the pixels corresponding to the core superimposed on the image, and as a function of λ.σ (v).

Thus, a self-adaptive and parametrizable filtering is obtained. This is therefore a space-time convolution filter. The parameter γ makes it possible to set the temporal dependence, and the parameter λ makes it possible to set the strength of the filtering.

One skilled in the art may make or propose various modifications to the structure and/or function and/or steps and/or manner and/or way and /or result and equivalents thereof without departing from the scope and extent of protection of the invention.

What is claimed is:

1. A method for a space-time filtering of noise in radiography comprising:
   a. for each pixel having coordinates (x,y) of a first image, a weighting is performed on coefficients U(k,l) of a first convolution core with a dimension D, equivalent to a low-pass filter, as a function of a coefficient G which is a function of a difference computed between I(x,y) and I(x+k, y+l), where I(x,y) is an intensity of the pixel with coordinates (x,y) of the first image, and k and l are indices used to explore the coefficients of the first convolution core, a second convolution core with coefficients Up(k,l) being thus obtained;
   b. for each pixel with coordinates (x,y) of the first image, a weighting is performed on the coefficients U(k,l) of the first convolution core as a function of the coefficient G which is a function of the difference computed between I(x,y) and I'(x+k, y+l), where I'(x,y) is an intensity of the pixel with coordinates (x,y) of a second image, a third convolution core with coefficients Up' (k,l) being thus obtained; and
   c. a filtered value of I(x,y) is computed by the formula:

$$F(x,y) = \left( \sum_{k=-L}^{L} \sum_{l=-L}^{L} (\gamma * Up(k,l).I(x+k, y+l) + (1-\gamma) * Up'(k,l).I'(x+k, y+l)) \right) / N \quad (1)$$

$$L = (D-1)/2 \quad (2)$$

$$\gamma \in [0,1] \quad (3)$$

$$N = \sum_{k=-L}^{L} \sum_{l=-L}^{L} (\gamma * Up(k,l) + (1-\gamma) * Up'(k,l)) \quad (4)$$

where F(x,y) is the filtered value of I(x,y); and
wherein D is greater than 1;
wherein a value of γ is greater than 0 and less than 1.

2. The method according to claim 1 wherein:

$$Up(k,l)=U(k,l) \times G(I(x+k, y+l)-I(x,y); \sigma(I(x,y))); \text{ and}$$

$$Up'(k,l)=U(k,l) \times G(I'(x+k, y+l)-I(x,y); \lambda.\sigma(I(x,y)))$$

with G as a weighting function depending on a difference $\in$ between the value of the pixel to be filtered and its neighborhood and depending on a noise statistic $\sigma$ for the value of the pixel to be filtered at a filter strength defined by $\lambda$.

3. The method according to claim 2 wherein G is a function of a difference $\in$ computed end of a known noise statistic $\sigma$ for I(x,y), the coefficient G being then written as a function $G(\in, \sigma)$, where G is therefore a value in terms of $\in$ of a Gaussian curve centered on 0 and having a standard deviation $\sigma$.

4. The method according to claim 2 wherein G is a function of the computed difference $\in$ of the following type:

$$G(\in)=-a. \in +1, \text{ with } a>0,$$

$$Up(k,l)=U(k,l) \times G(I(x+k,y+l)-I(x,y)), \text{ and}$$

$$U'p(k,l)=U(k,l) \times G(I'(x+k,y+l)-I(x,y)).$$

5. The method according to claim 2 wherein $\lambda$ is a real number.

6. The method according to claim 3 wherein $\lambda$ is a real number.

7. The method according to claim 4 wherein $\lambda$ is a real number.

8. The method according to claim 1 wherein equation (1) becomes:

$$F(x,y) = \left( \sum_{k=-L}^{L} \sum_{l=-L}^{L} (\gamma * Up(k,l) \cdot I(x+k, y+l) + (1-\gamma) * Up'(k,l) \cdot F'(x+k, y+l)) \right) / N$$

where F'(x,y) is the filtered intensity of the pixel with coordinates (x,y) of the second image.

9. The method according to claim 2 wherein equation (1) becomes:

$$F(x,y) = \left( \sum_{k=-L}^{L} \sum_{l=-L}^{L} (\gamma * Up(k,l) \cdot I(x+k, y+l) + (1-\gamma) * Up'(k,l) \cdot F'(x+k, y+l)) \right) / N$$

where F'(x,y) is the filtered intensity of the pixel with coordinates (x,y) of the second image.

10. The method according to claim 3 wherein equation (1) becomes:

$$F(x,y) = \left( \sum_{k=-L}^{L} \sum_{l=-L}^{L} (\gamma * Up(k,l) \cdot I(x+k, y+l) + (1-\gamma) * Up'(k,l) \cdot F'(x+k, y+l)) \right) / N$$

where F'(x,y) is the filtered intensity of the pixel with coordinates (x,y) of the second image.

11. The method according to claim 4 wherein equation (1) becomes:

$$F(x,y) = \left( \sum_{k=-L}^{L} \sum_{l=-L}^{L} (\gamma * Up(k,l) \cdot I(x+k, y+l) + (1-\gamma) * Up'(k,l) \cdot F'(x+k, y+l)) \right) / N$$

where F'(x,y) is the filtered intensity of the pixel with coordinates (x,y) of the second image.

12. The method according to claim 5 wherein equation (1) becomes:

$$F(x,y) = \left( \sum_{k=-L}^{L} \sum_{l=-L}^{L} (\gamma * Up(k,l) \cdot I(x+k, y+l) + (1-\gamma) * Up'(k,l) \cdot F'(x+k, y+l)) \right) / N$$

where F'(x,y) is the filtered intensity of the pixel with coordinates (x,y) of the second image.

13. The method according to claim 1 wherein the first and second images are successive images of a sequence of images, the first image having a time t, and the second image having a time t−1.

14. The method according to claim 2 wherein the first and second images are successive images of a sequence of images, the first image having a time t, and the second image having a time t−1.

15. The method according to claim 3 wherein the first and second images are successive images of a sequence of images, the first image having a time t, and the second image having a time t−1.

16. The method according to claim 4 wherein the first and second images are successive images of a sequence of images, the first image having a time t, and the second image having a time t−1.

17. The method according to claim 5 wherein the first and second images are successive images of a sequence of images, the first image having a time t, and the second image having a time t−1.

18. The method according to claim 8 wherein the first and second images are successive images of a sequence of images, the first image having a time t, and the second image having a time t−1.

19. The method according to claim 1 wherein D is equal to 5.

20. The method according to claim 2 wherein D is equal to 5.

21. The method according to claim 3 wherein D is equal to 5.

22. The method according to claim 4 wherein D is equal to 5.

23. The method according to claim 5 wherein D is equal to 5.

24. The method according to claim 8 wherein D is equal to 5.

25. The method according to claim 13 wherein D is equal to 5.

26. The method according to claim 1 wherein D is greater than 5.

27. The method according to claim 2 wherein D is greater than 5.

28. The method according to claim 3 wherein D is greater than 5.

29. The method according to claim 4 wherein D is greater than 5.

30. The method according to claim 5 wherein D is greater than 5.

31. The method according to claim 8 wherein D is greater than 5.

32. The method according to claim 13 wherein D is greater than 5.

33. The method according to claim 1 wherein D is an odd number.

34. The method according to claim 2 wherein D is an odd number.

35. The method according to claim 3 wherein D is an odd number.

36. The method according to claim 4 wherein D is an odd number.

37. The method according to claim 5 wherein D is an odd number.

38. The method according to claim 8 wherein D is an odd number.

39. The method according to claim 13 wherein D is an odd number.

40. The method according to claim 19 wherein D is an odd number.

41. The method according to claim 26 wherein D is an odd number.

42. A space-time convolution filter designed according to the method of claim 1.

43. A scanner for radiography having a filter according to claim 42.

44. A computer program product comprising a computer readable medium having computer readable program code means stored in the medium, the computer program product comprising:
  a. computer readable program code means stored in the medium for causing a computer to provide for each pixel having coordinates (x,y) of a first image, a weighting is performed on coefficients U(k,l) of a first convolution core with a dimension D, equivalent to a low-pass filter, as a function of a coefficient G which is a function of a difference computed between I(x,y) and I(x+k, y+l), where I(x,y) is an intensity of the pixel with coordinates (x,y) of the first image, and k and l are indices used to explore the coefficients of the first convolution core, a second convolution core with coefficients Up(k,l) being thus obtained;
  b. computer readable program code means stored in the medium for causing a computer to provide for each pixel with coordinates (x,y) of the first image, a weighting is performed on the coefficients U(k,l) of the first convolution core as a function of the coefficient G which is a function of the difference computed between I(x,y) and I'(x+k, y+l), where I'(x,y) is an intensity of the pixel with coordinates (x,y) of a second image, a third convolution core with coefficients Up'(k,l) being thus obtained; and
  c. computer readable program code means stored in the medium for causing a computer to provide a filtered value of I(x,y) is computed by the formula:

$$F(x, y) = \left( \sum_{k=-L}^{L} \sum_{l=-L}^{L} (\gamma * Up(k, l) \cdot I(x+k, y+l) + (1-\gamma) * Up'(k, l) \cdot I'(x+k, y+l)) \right) / N \quad (1)$$

$$L = (D-1)/2 \quad (2)$$

$$\gamma \in [0,1] \quad (3)$$

$$N = \sum_{k=-L}^{L} \sum_{l=-L}^{L} (\gamma * Up(k, l) + (1-\gamma) * Up'(k, l)) \quad (4)$$

where F(x,y) is the filtered value of I(x,y); and
wherein D is greater than 1;
wherein a value of γ is greater than 0 and less than 1.

45. An article of manufacture for use with a computer system, the article of manufacture comprising a computer readable medium having computer readable program code means stored in the medium, the program code means comprising:
  a. computer readable program code means stored in the medium for causing a computer to provide for each pixel having coordinates (x,y) of a first image, a weighting is performed on coefficients U(k,l) of a first convolution core with a dimension D, equivalent to a low-pass filter, as a function of a coefficient G which is a function of a difference computed between I(x,y) and I(x+k, y+l), where I(x,y) is an intensity of the pixel with coordinates (x,y) of the first image, and k and l are indices used to explore the coefficients of the first convolution core, a second convolution core with coefficients Up(k,l) being thus obtained;
  b. computer readable program code means stored in the medium for causing a computer to provide for each pixel with coordinates (x,y) of the first image, a weighting is performed on the coefficients U(k,l) of the first convolution core as a function of the coefficient G which is a function of the difference computed between I(x,y) and I'(x+k, y+l), where I'(x,y) is an intensity of the pixel with coordinates (x,y) of a second image, a third convolution core with coefficients Up'(k,l) being thus obtained; and
  c. computer readable program code means stored in the medium for causing a computer to provide a filtered value of I(x,y) is computed by the formula:

$$F(x, y) = \left( \sum_{k=-L}^{L} \sum_{l=-L}^{L} (\gamma * Up(k, l) \cdot I(x+k, y+l) + (1-\gamma) * Up'(k, l) \cdot I'(x+k, y+l)) \right) / N \quad (1)$$

$$L = (D-1)/2 \quad (2)$$

$$\gamma \in [0,1] \quad (3)$$

$$N = \sum_{k=-L}^{L} \sum_{l=-L}^{L} (\gamma * Up(k, l) + (1-\gamma) * Up'(k, l)) \quad (4)$$

where F(x,y) is the filtered value of I(x,y); and
wherein D is greater then 1;
wherein a value of ε is greater than 0 and less than 1.

* * * * *